United States Patent [19]

Korus

[11] Patent Number: 4,564,224
[45] Date of Patent: Jan. 14, 1986

[54] COUPLING DEVICE

[75] Inventor: Thomas J. Korus, Lindsay, Nebr.

[73] Assignee: Lindsay Manufacturing Company, Lindsay, Nebr.

[21] Appl. No.: 439,346

[22] Filed: Nov. 5, 1982

[51] Int. Cl.4 ............................................. F16L 27/00
[52] U.S. Cl. .................................... 285/272; 285/265; 285/5
[58] Field of Search ............... 285/223, 235, 236, 226, 285/264, 265, 5, 272

[56] References Cited

U.S. PATENT DOCUMENTS

| | | | |
|---|---|---|---|
| 922,075 | 5/1909 | Bates | 285/265 X |
| 2,623,763 | 12/1952 | Fauser | 285/265 |
| 2,904,356 | 9/1959 | Love | 285/226 |
| 2,936,185 | 5/1960 | Olsen et al. | 285/226 |
| 3,738,687 | 6/1973 | Zimmerer et al. | 285/5 |
| 3,811,713 | 5/1974 | Barrett et al. | 285/226 |
| 3,994,514 | 11/1976 | Zimmerer et al. | 285/5 |

*Primary Examiner*—Dave W. Arola
*Attorney, Agent, or Firm*—Kinzer, Plyer, Dorn & McEachran

[57] ABSTRACT

This is a coupling arrangement which is usable in an overhead irrigation system of the traveling or moving type more commonly known as center pivot and laterally moving irrigation systems. The present coupling arrangement is connected between the slightly spaced ends of two pipes which are generally aligned. A flexible coupling in the nature of a mechanical interlock is positioned within and between the ends of the pipes and a sealing arrangement is disposed around the coupling with the coupling itself being constructed and arranged to provide for and accept misalignment to some degree between the pipes and also for some swiveling. This is also an alignment arrangement for irrigation systems.

8 Claims, 8 Drawing Figures

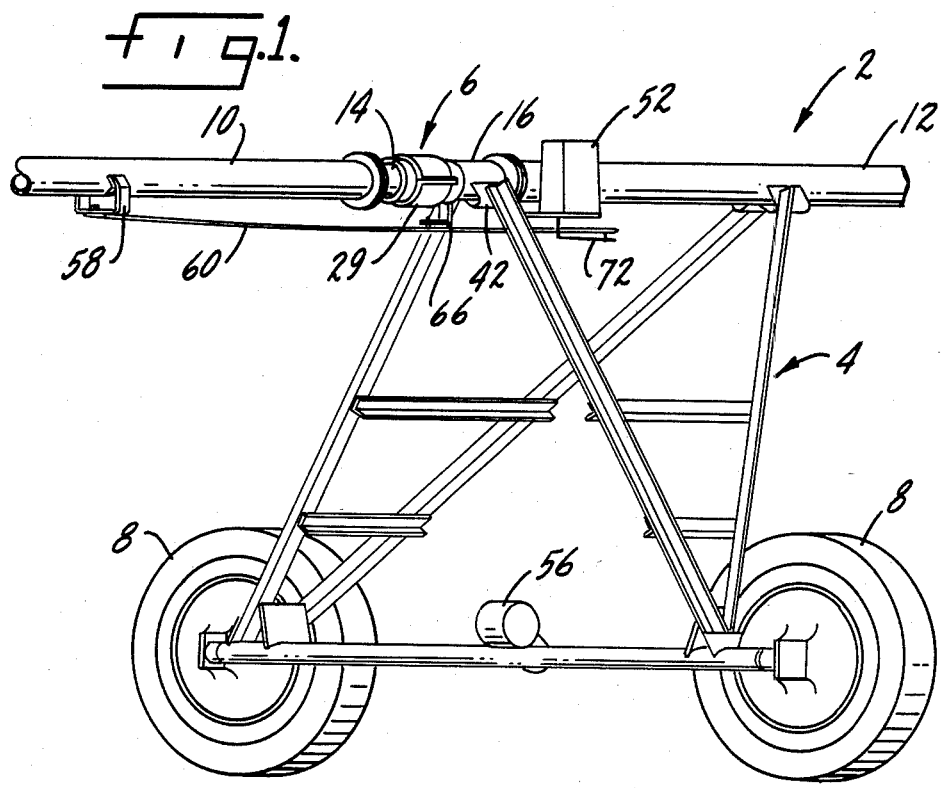
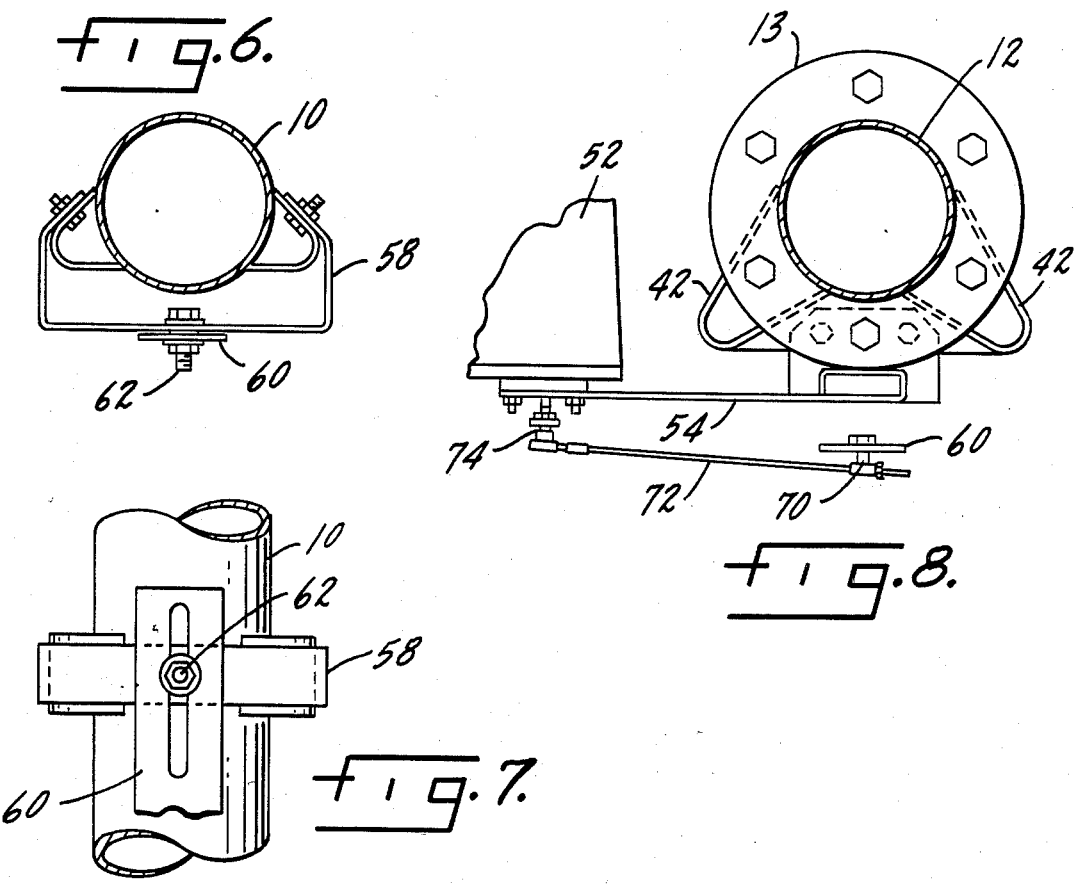

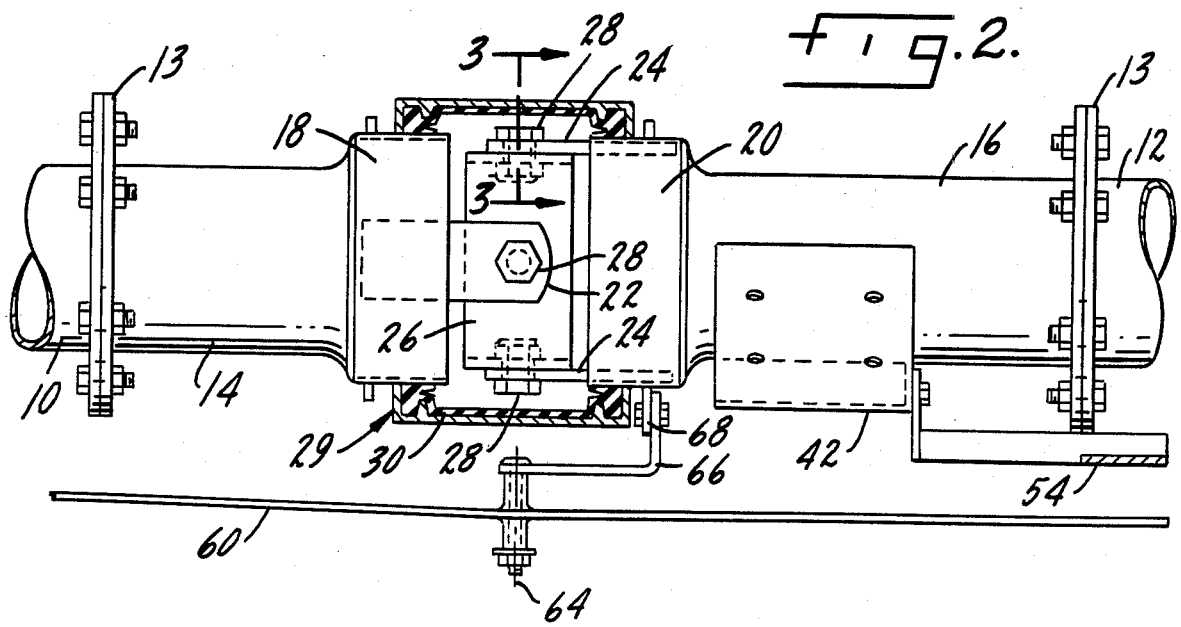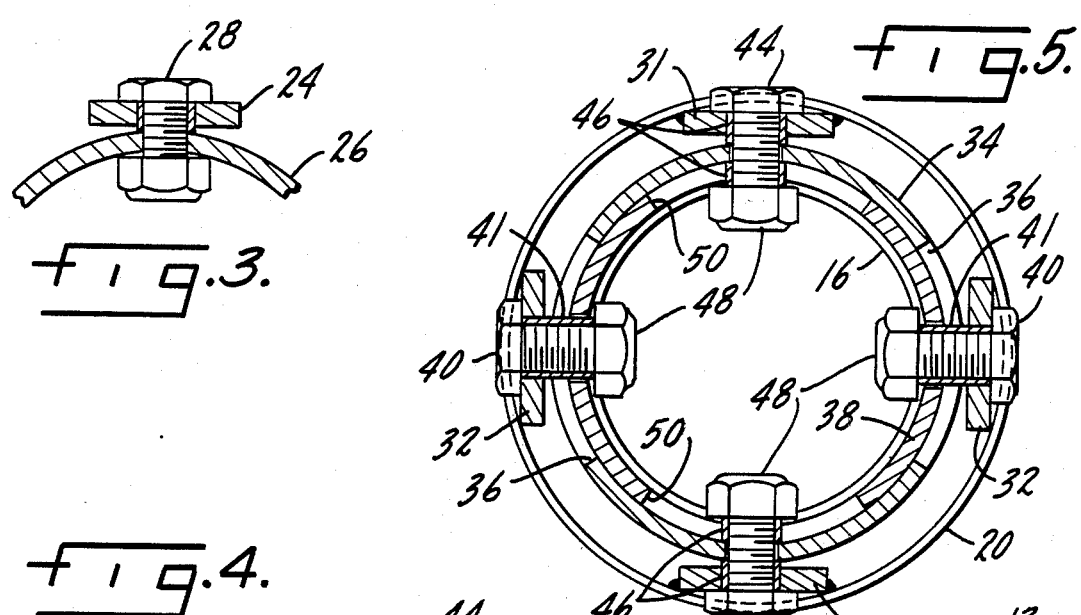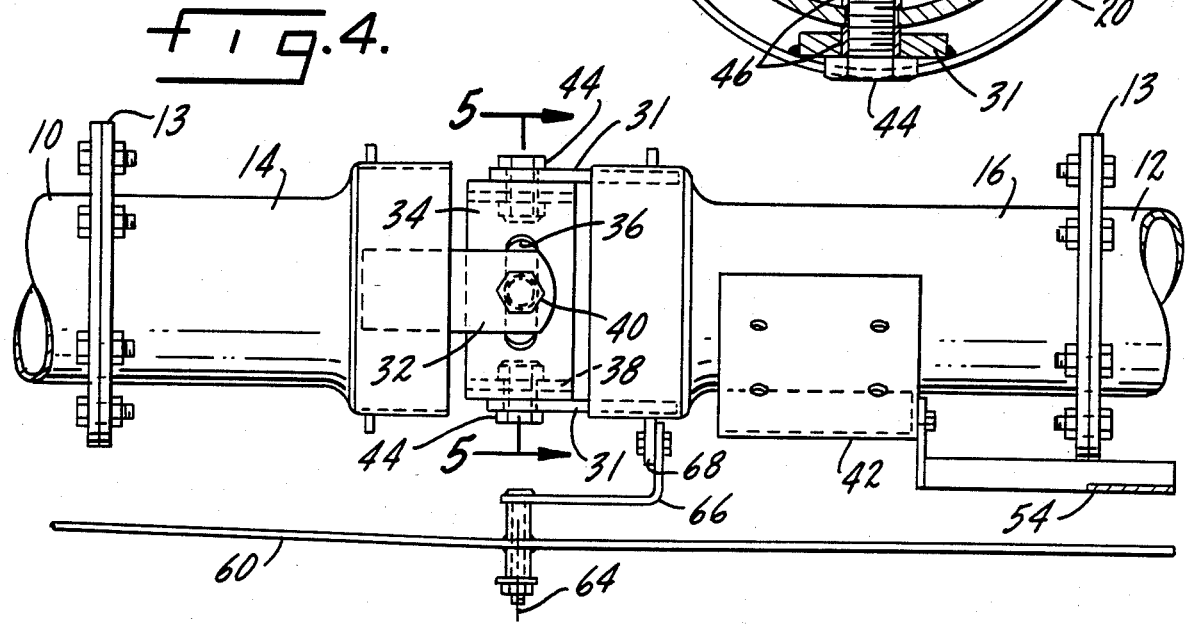

COUPLING DEVICE

SUMMARY OF THE INVENTION

This invention is concerned with a pipe joint to be positioned between the slightly spaced ends of a pair of generally aligned pipes primarily usable in agricultural irrigation equipment and is more specifically applicable to overhead irrigation systems either of the center pivot or lateral move types.

A primary object of the invention is a coupling or joint of the above type which is substantially lighter than prior devices and therefore less costly.

Another object is a device of the above type which has a flexible joint inside of the sealing sleeve.

Another object is an alignment arrangement for irrigation systems.

Another object is a greatly simplified gimbal ring and coupler bars for a joint of the above type which reduces the overall size of the joint.

Another object is a pipe joint of the above type which is specifically constructed and arranged to provide or accommodate some swiveling movement.

Other objects will appear from time to time in the ensuing specification and drawings.

BRIEF DESCRIPTION OF THE DRAWINGS

The invention is illustrated more or less diagrammatically in the following drawings wherein:

FIG. 1 is a perspective of a movable tower and part of an overhead irrigation system;

FIG. 2 is a side view, on an enlarged scale, of the coupling in FIG. 1 with parts in section;

FIG. 3 is a section along line 3—3 of FIG. 2, on an enlarged scale;

FIG. 4 is a side view of a modified form;

FIG. 5 is a section along line 5—5 of FIG. 4, on an enlarged scale;

FIG. 6 is a sectional view taken from the left end of the pipeline in FIG. 1;

FIG. 7 is a bottom view of FIG. 6; and

FIG. 8 is a sectional view of the pipeline taken from the right end of FIG. 1.

DESCRIPTION OF THE PREFERRED EMBODIMENT

As shown in FIG. 1, a pipeline indicated generally at 2 is supported on a conventional tower indicated at 4 with the angle irons of the towers being welded or otherwise connected to one end of one pipe span with the adjacent end of the next pipe span being spaced therefrom with the two ends being joined by a coupler 6. The tower may be electrically or hydraulically driven for movement on suitable tires or wheels 8, all of which may be conventional.

As shown in FIG. 2, the two pipe ends 10 and 12 each are flanged as at 13 to a separate pipe section or joint 14 and 16, each of which may be enlarged or belled out somewhat as at 18 and 20. It will be noted that section 16 is somewhat longer than 14 so that they cannot be inadvertently interchanged. While separate sections 14 and 16 have been shown, it should be understood that, under certain circumstances, it may be appropriate to extend the ends of the pipe 10 and 12 up close to each other and then bell out the axial ends of the pipe as shown at 18 and 20.

In any event, each of the enlarged ends carries a pair of coupler bars 22 and 24 which are spaced 180° from each other and are connected by welding or otherwise to the belled out ends of the sections 14 and 16. The coupler bars extend axially into the space between the ends of the pipe which, as shown in FIG. 2, are spaced somewhat from each other to accept a gimbal ring 26 which, as shown, has a slightly smaller outside diameter than the belled ends 18 and 20 and has an axial length somewhat less than the spacing between the ends of 18 and 20 such that it will fit between the pipe ends. The coupler bars 22 of one pipe end are indexed at generally 90° from the coupler bars 24 of the other. Coupler bars 22 shall be referred to as the horizontal coupler bars since they are horizontally opposite each other while, for the same reason, coupler bars 24 shall be referred to as the vertical coupler bars. The ends of each of the coupler bars are connected to the gimbal ring by a suitable screw or bolt 28 which allows the coupler bars to pivot relative to the gimbal ring. It will be noted that the gimbal ring is generally round and is hollow on the inside.

The space between the pipe ends may be closed by a joint 29 which may be made up of two half shells, each covering 180° approximately, and bolted along their opposing edges with the bolts extending through flanges along the lines of what is shown in prior U.S. Pat. No. 3,738,687, issued June 12, 1973. The split coupler may have a sealing boot 30 on the inside thereof which may be along the lines of U.S. Pat. No. 3,994,514, issued Nov. 30, 1976. While this is given as an example, it should be understood that the details may be varied somewhat.

The arrangement has the advantage that the gimbal ring and coupler bars are totally enclosed within the joint so that the overall connection is greatly simplified and is reduced both in cost and in weight.

In FIGS. 4 and 5, a variant form has been shown in which the vertical coupler bars, now designated 31, and horizontal coupler bars, designated 32, are connected or joined into the gimbal ring in a variant manner. As shown in FIG. 5, the gimbal ring 34 has extended slots 36 on each side. A circular shoe 38 in the nature of a ring is positioned inside of the gimbal ring. The bolts or screws 40 for the horizontal coupler bars 32 have bushings 41 which surround the shank of the bolts and pass through the slots 36 in the gimbal ring and are socketed into the sides of the circular shoe 38. Thus, the weight or load of the left end pipe in FIG. 4 will be carried by the shoe 38 into the gimbal ring, then into the vertical coupler bars 31 to the right pipe end which is supported by the tower, although the leg of the tower connected to brackets 42 has not been shown in FIG. 4. Reference is made to FIG. 1 in this regard. The upper and lower screws 44 for the vertical coupler bars carry bushings 46 and connect through the gimbal ring and extend inside of the gimbal ring and fit into slots 50 of limited arcuate extent in the shoe 38. Bolts 40, 44 have lock nuts 48 which keep the shoe in place and prevent it from being displaced. Although a completed joint has not been shown in FIG. 4, i.e. the two half shells and sealing boot shown in FIG. 2 have not been duplicated in FIG. 4, it will be understood that this is for purposes of clarity and the FIG. 4 joint would have a sealing arrangement of this or some other nature.

As compared to FIG. 2, the FIG. 4–5 form has the advantage that the joint can swivel slightly i.e. the left pipe can rotate somewhat about its own axis which will cause the shoe 38 to rotate somewhat, either clockwise or counterclockwise, within the gimbal ring. But at the same time lateral positioning will be maintained, axial alignment or such misalignment as exists will not be affected and other functional relationships of one pipe section relative to the other will be maintained or insured.

A so-called tower box 52 is supported on a bracket 54 which in turn is connected to the brackets 42, as shown in FIGS. 1, 2, 4 and 8. The tower box contains the usual controls which provides signals to the electric drive or motor, indicated at 56 in FIG. 1, which in turn powers the wheels. Basically, for purposes of the present situation, the box contains a switch which is either turned off or on due to misalignment of a certain degree between one pipe section and the other so that the motor will be energized to reduce the amount of misalignment and turned off when the misalignment is within an acceptable amount.

The left pipe section carries a bracket 58 of any suitable type which is disposed below the pipe and at a certain distance from the coupling. An elongated strap 60 is connected at one end to the bracket 58 by a pin and slot connection 62 to provide some longitudinal movement of the strap relative to the pipe and bracket. The strap is pivotally mounted as at 64 on an angle 66 which is connected in turn to a mounting or bracket 68 on one of the belled ends of the pipe. The pivotal axis 64 of the strap mounting is aligned with the pivotal axis between the gimbal ring and the vertical coupler bars 31 in FIG. 4. This is also true of the FIG. 2 arrangement. The other end of the strap is connected as at 70, by an adjustable connection as shown in FIG. 8, to a rod or arm 72 which extends laterally to a connection 74 underneath the control box where it operates the switch for controlling the motor drive 56. It will be noted that from the pivot point 64 the strap is substantially longer to the underpipe bracket 58 on the left end than it is to the control box arm 72 on the right end, something on the order of 3:1 or 4:1.

The use, operation and function of the invention are as follows:

Prior coupling devices of the type used to connect the ends of adjacent pipe sections in either center pivot or lateral move irrigation systems have as a disadvantage that they are large, bulky and expensive. Most such take the form of some sort of an external connection which is undesirable in many respects.

In the present arrangement, the gimbal ring and coupler bars are totally enclosed within the split coupler and boot so that they are fully sealed. Furthermore, the ends of the opposed pipe where there are special sections of the pipe themselves have been enlarged somewhat so there is no restriction of flow through the joint. While the belled out portions may be a mere enlargement of the pipes themselves or the special sections as the case may be, they may take the form of a special ring welded or otherwise fitted to a flared out end on the pipe or short section.

In addition the swiveling arrangement explained in connection with FIGS. 4 and 5 has the advantage that in addition to accommodating misalignment between adjacent pipe sections, some degree of swiveling can also be accommodated.

The signalling arrangement involving the extended strap positioned under the pipe sections has the advantage that to whatever degree there is displacement during swiveling, it will be absorbed by the elongated strap and in fact the pin and slot connection underneath one of the pipe sections at the long end of the strap as shown in FIGS. 6 and 7, will accommodate any misalignment without transmitting it to a detrimental extent to the switch in the control box. It will be noted that the arms from the pivot under the joint is longer to the left pipe section, which will swivel as shown in FIG. 4, than it is from the pivot to the control box. Thus, whatever degree of displacement is applied to the long end of the strap at the bracket 58 will be subdivided by the ratio of the distances involved which may be easily set within the operative tolerances of the switch in the control box.

Whereas the preferred form and several variations of the invention have been shown and described and suggested, it should be understood that suitable additional modifications, changes, substitutions and alterations may be made without departing from the invention's fundamental theme.

I claim:

1. In a pipe joint, two generally axially aligned pipes terminating in planar ends which are in substantial spaced relation to each other, a gimbal ring between the pipe ends and of an outside diameter on the order of and no greater than the outside diameter of the pipe ends and of an axial extent such that it does not axially overlap the pipe ends, two pairs of coupler bars, 180° apart having inner and outer ends, and means connecting one pair at their outer ends to one of the pipe ends and the other pair at their outer ends to the other pipe end and means pivotally connecting said bars at their inner ends to the gimbal ring, one pair being spaced about 90° from the other such that their pivot axes are generally perpendicular to each other, and a sealing sleeve in sealing engagement with said pipe ends and surrounding the ends of both pipes, the gimbal ring, and the coupler bars.

2. The structure of claim 1 further characterized in that the pipe ends are increased in diameter relative to the rest of the pipe.

3. The structure of claim 1 further characterized by said means pivotally connecting including circumferential pin-and-slot connections between the gimbal ring and one of the pairs of coupler bars so that the joint may swivel.

4. The structure of claim 1 further characterized in that the gimbal ring has an outside diameter on the order of the inside diameter of the pipe ends.

5. The structure of claim 1 further characterized in that the gimbal ring is round.

6. The structure of claim 1 further characterized in that the sealing sleeve includes a rigid generally cylindrical coupler, and a sealing arrangement inside the coupler in sealing engagement with each of the pipe ends.

7. The structure of claim 1 further characterized by said means pivotally connecting including circumferential pin-and-slot connections between the gimbal ring and at least one of the pairs of coupler bars so that the joint may swivel, and a circular shoe engaging the pins of the pin-and-slot connections and in engagement with the gimbal ring.

8. The structure of claim 7 in which the shoe is inside the gimbal ring.

* * * * *